US007287672B2

(12) United States Patent
Garcia

(10) Patent No.: US 7,287,672 B2
(45) Date of Patent: Oct. 30, 2007

(54) FLUID DISPENSER MEMBER AND A DISPENSER INCLUDING SUCH A MEMBER

(75) Inventor: Firmin Garcia, Evreux (FR)

(73) Assignee: Valois S.A.S., Lē Neubourg (FR)

( * ) Notice: Subject to any disclaimer, the term of this patent is extended or adjusted under 35 U.S.C. 154(b) by 197 days.

(21) Appl. No.: 10/902,775

(22) Filed: Aug. 2, 2004

(65) Prior Publication Data

US 2005/0133535 A1 Jun. 23, 2005

(30) Foreign Application Priority Data

| | | |
|---|---|---|
| Dec. 22, 2003 | (FR) | 03 15192 |
| Dec. 22, 2003 | (FR) | 03 15193 |
| Dec. 22, 2003 | (FR) | 03 15194 |
| May 14, 2004 | (WO) | PCT/FR04/01188 |
| May 14, 2004 | (WO) | PCT/FR04/01190 |

(51) Int. Cl.
*B65D 88/54* (2006.01)
*G01F 11/00* (2006.01)

(52) U.S. Cl. .............................. 222/321.8; 222/321.1; 222/321.7; 222/340; 222/321.9

(58) Field of Classification Search ............. 222/321.2, 222/321.7, 321.8, 321.9, 340, 154
See application file for complete search history.

(56) References Cited

U.S. PATENT DOCUMENTS 3,387,789 A * 6/1968 Fedit et al. ................. 239/333
3,406,909 A * 10/1968 Pfeiffer ........................ 239/333
4,050,613 A * 9/1977 Corsette .................. 222/321.2
4,071,172 A * 1/1978 Balogh .................... 222/321.7
4,231,493 A * 11/1980 Kutik et al. ............ 222/321.9
4,371,097 A * 2/1983 O'Neill ................... 222/321.7
4,410,107 A * 10/1983 Corsette .................. 222/321.7
5,392,962 A * 2/1995 Meshberg ................ 222/321.8
5,590,815 A * 1/1997 Montaner et al. ............. 222/82
5,752,627 A * 5/1998 Vandromme et al. ....... 222/137
5,813,571 A * 9/1998 Gaucher ...................... 222/95
6,010,036 A * 1/2000 Bougamont et al. ........ 222/183
6,021,924 A * 2/2000 Suck et al. ................. 222/105
6,223,951 B1 * 5/2001 Siegel et al. ................ 222/148

FOREIGN PATENT DOCUMENTS

WO WO 03/026803 A1 * 3/2003 ............. 222/321.1

* cited by examiner

*Primary Examiner*—Kevin Shaver
*Assistant Examiner*—Stephanie E. Tyler
(74) *Attorney, Agent, or Firm*—Sughrue Mion Pllc.

(57) ABSTRACT

A fluid dispenser member designed to be associated with a fluid reservoir having a neck, said member comprising: a body defining at least part of a fluid chamber, said body being provided with fixing means for fixing onto the neck of the reservoir, said body including a fluid inlet connecting the inside of the reservoir to the fluid chamber; a pusher mounted on the body in such a manner as to be displaced axially between a rest position and a driven-in position; and a spring urging the pusher into the rest position, wherein the spring is housed entirely inside the pusher, and the body is made of a transparent or translucent material.

12 Claims, 3 Drawing Sheets

FLUID DISPENSER MEMBER AND A DISPENSER INCLUDING SUCH A MEMBER

The present invention relates to a fluid dispenser member that is generally designed to be associated with a fluid reservoir in order to constitute together a fluid dispenser. The dispenser member is generally actuated manually by means of one of the user's fingers. The fluid is dispensed in the form of a jet of finely-sprayed droplets, in the form of a continuous stream, or even in the form of a bead of fluid, particularly in the case of viscous fluids such as cosmetic creams. Such a fluid dispenser member can be used in the fields of perfumery, cosmetics, or even pharmacy, in order to dispense fluids of various degrees of viscosity.

BACKGROUND OF THE INVENTION

The present invention relates more particularly, but not exclusively, to a type of dispenser member which is commonly designated under the term "pusher-pump". Such a designation is explained by the fact that the dispenser member includes a pusher forming not only a dispenser orifice, but also defining a portion of a fluid chamber in which the fluid is put under pressure selectively. In the case of a pump, the fluid chamber is a pump chamber. A characteristic of the pusher-pump resides in the fact that an inside surface of the generally substantially cylindrical pusher serves as a surface against which the piston moves in leaktight sliding contact, thereby selectively revealing the dispenser orifice. The piston is generally a piston of the differential type, which moves in response to a variation in the pressure of the fluid inside the chamber. The differential piston is different from the main piston, which is moved by actuating the pusher. Thus, in such a pusher-pump, there are both a differential piston and a main piston, which are displaceable in leaktight contact in respective cylinders. The main cylinder for the main piston may also be formed inside the pusher.

This applies, in particular, to the case of the pump described in document WO 97/23304. The pusher includes a press wall on which pressure is exerted by means of a finger in order to actuate the pusher. Furthermore, the pusher includes a skirt which extends downwards from the press wall. The skirt forms a first leaktight sliding cylinder for a differential piston and a main, second cylinder for the main piston of the pump. The differential piston is disassociated from the main piston. The differential piston is urged away from the press wall by a spring which serves both as a return spring and as a precompression spring. The cylinder in which the differential piston slides is formed with an outlet duct which leads to a nozzle fixed in a housing formed in the skirt of the pusher. The nozzle forms a dispenser orifice through which the fluid leaves the dispenser member. Furthermore, the housing formed in the skirt is provided with a swirl system which co-operates with the nozzle so as to cause the fluid to swirl before leaving through the dispenser orifice. When the pusher is pressed, the main piston rises in the main cylinder of the pusher, thereby causing the differential piston to slide in leaktight manner inside the differential cylinder. This compresses the spring: the differential piston then moves upwards towards the press wall of the pusher. The active sealing lip of the differential piston, which is in direct contact with the fluid, slides in the bottom portion of the cylinder situated below the outlet channel. As soon as the differential piston arrives at the outlet duct, the fluid put under pressure in the chamber is expelled from the chamber through said duct and travels to the nozzle where it is swirled and ejected through the dispenser orifice.

The present invention therefore relates mainly, but not exclusively, to that type of dispenser member, better known under the term "pusher-pump". The present invention relates still more particularly, but not exclusively, to dispenser members of the pusher-pump type that are used as samples. Under such circumstances, the dispenser member is of small size and of small capacity and is mounted on a small-sized reservoir, referred to herein as a "flask". The flask is generally made of drawn glass, but may also be made of plastics material, or of metal. In the broad field of samples, and more particularly in the field of perfumery, samples of perfume are often presented in the form of a glass flask provided with a stopper. The stopper may be made in two portions, namely a base portion secured to the flask at its opening, and a stopper portion that is removably mountable in leaktight manner on the base portion.

The user sees immediately that the sample comprises a reservoir portion, a base portion, and a stopper portion. The base portion provides the interface or the junction between the stopper portion and the reservoir portion.

In general, the base portion and the stopper portion are made of inexpensive plastics materials which are generally translucent or transparent. It is therefore possible to see through the base portion and/or the stopper portion.

OBJECTS AND SUMMARY OF THE INVENTION

The object of the present invention is to make a fluid dispenser member, and more generally a fluid dispenser, which has the overall general appearance of a stopper formed of a base portion and a stopper portion.

To do this, the present invention provides a fluid dispenser member designed to be associated with a fluid reservoir having a neck, said member comprising: a body defining at least part of a fluid chamber, said body being provided with fixing means for fixing onto the neck of the reservoir, said body including a fluid inlet connecting the inside of the reservoir to the fluid chamber; a pusher mounted on the body in such a manner as to be axially displaceable between a rest position and a driven-in position; and a spring urging the pusher into the rest position, wherein the spring is housed entirely inside the pusher, and the body is made of a transparent or translucent material. Thus, compared with a conventional prior-art stopper, the pusher has the visual appearance of a stopper member, while the body has the visual appearance of a base portion fixed onto the reservoir or flask. By housing the spring entirely inside the pusher, the spring is not visible to the user. In addition, by making the body of transparent or translucent plastics material, said body comes closer to the visual appearance of the conventional base portion of a conventional stopper. The spring is the component of the dispenser member that can be seen most easily, given that it is conventionally made of steel. This is why it is important, in the context of the present invention, to mask it inside the pusher, which may itself be made of an opaque, white, or colored plastics material.

The intended purpose of housing the spring inside the pusher is to mask all the visible component elements of the pump inside an opaque element.

The pusher advantageously includes a lateral skirt engaged around an inner guide bushing formed on the body. The skirt and the bushing preferably include complementary abutment means defining the rest position. The pusher is thus axially displaceable about a portion of the body.

According to another characteristic of the invention, the fixing means are made integrally as a single piece with the body, and are advantageously designed to be engaged around the neck. Preferably, the dispenser member further comprises a piston element that is axially displaceable inside the pusher, the spring urging the piston element and the pusher into the rest position.

According to another advantageous aspect of the invention, the spring bears firstly against the pusher, and secondly against the piston element. In a variant, the spring bears firstly against the body and secondly against the piston element.

According to another characteristic, the piston element forms a movable inlet-valve member that is designed to be pressed in leaktight manner against an inlet valve seat formed on the body. In an embodiment, the piston element is housed entirely inside the pusher. It is thus possible to omit using a steel ball as a movable inlet-valve member. Said steel ball might be visible through the transparent or translucent body, thereby spoiling the appearance of the dispenser member, and as a result, the appearance of the dispenser as a whole.

By also housing the piston element inside the pusher, all the functional parts of the dispenser member are housed and masked inside the preferably-opaque pusher.

Thus, to the user, the dispenser member of the invention has the overall or general shape of a conventional stopper made up of a base portion and of a stopper portion. Consequently, the dispenser member may be integrated in a range of goods composed both of stoppers and of dispenser members.

The present invention also defines a fluid dispenser comprising a fluid reservoir and a dispenser member as described above. The body is advantageously in leaktight contact with the neck of the reservoir. Thus, it is not necessary to use a neck gasket to provide sealing between the body and the reservoir. The gasket, which is generally made from an elastomer material, is opaque, and as a result, is visible through the body and/or the reservoir.

According to another characteristic of the invention, the reservoir, the body, and the pusher have an identical maximum outside diameter, such that the dispenser has an overall cylindrical appearance that is advantageously circular. This tubular aspect is further reinforced when the fixing means for fixing the body are disposed around the reservoir neck, and when the pusher extends around the body.

BRIEF DESCRIPTION OF THE DRAWINGS

The invention is described more fully below with reference to the accompanying drawings which show two embodiments of the invention as non-limiting examples.

In the figures.

MORE DETAILED DESCRIPTION

Figure 1:
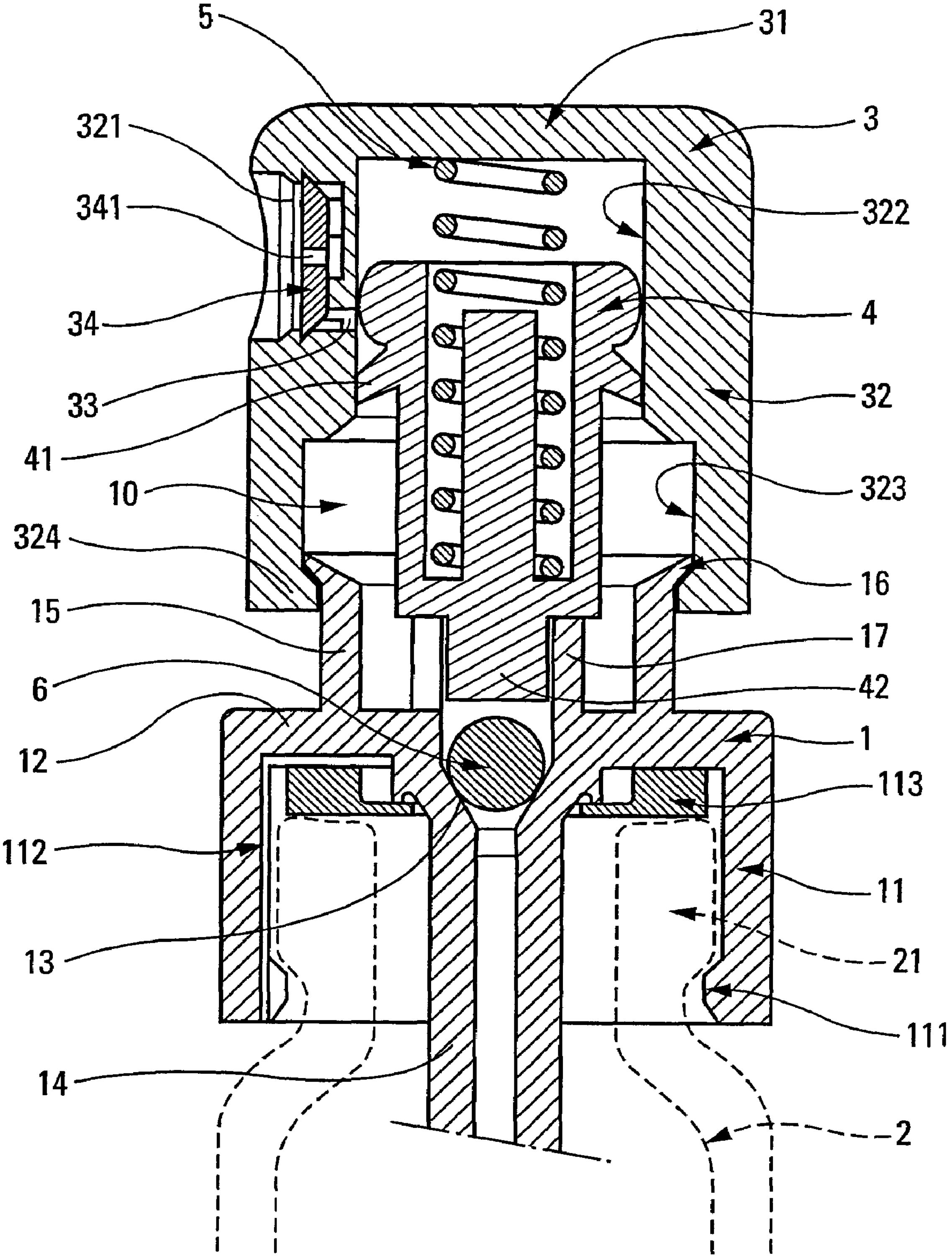
FIG. 1 is a vertical section view through a dispenser member constituting a first embodiment of the invention.
Figure 2A:
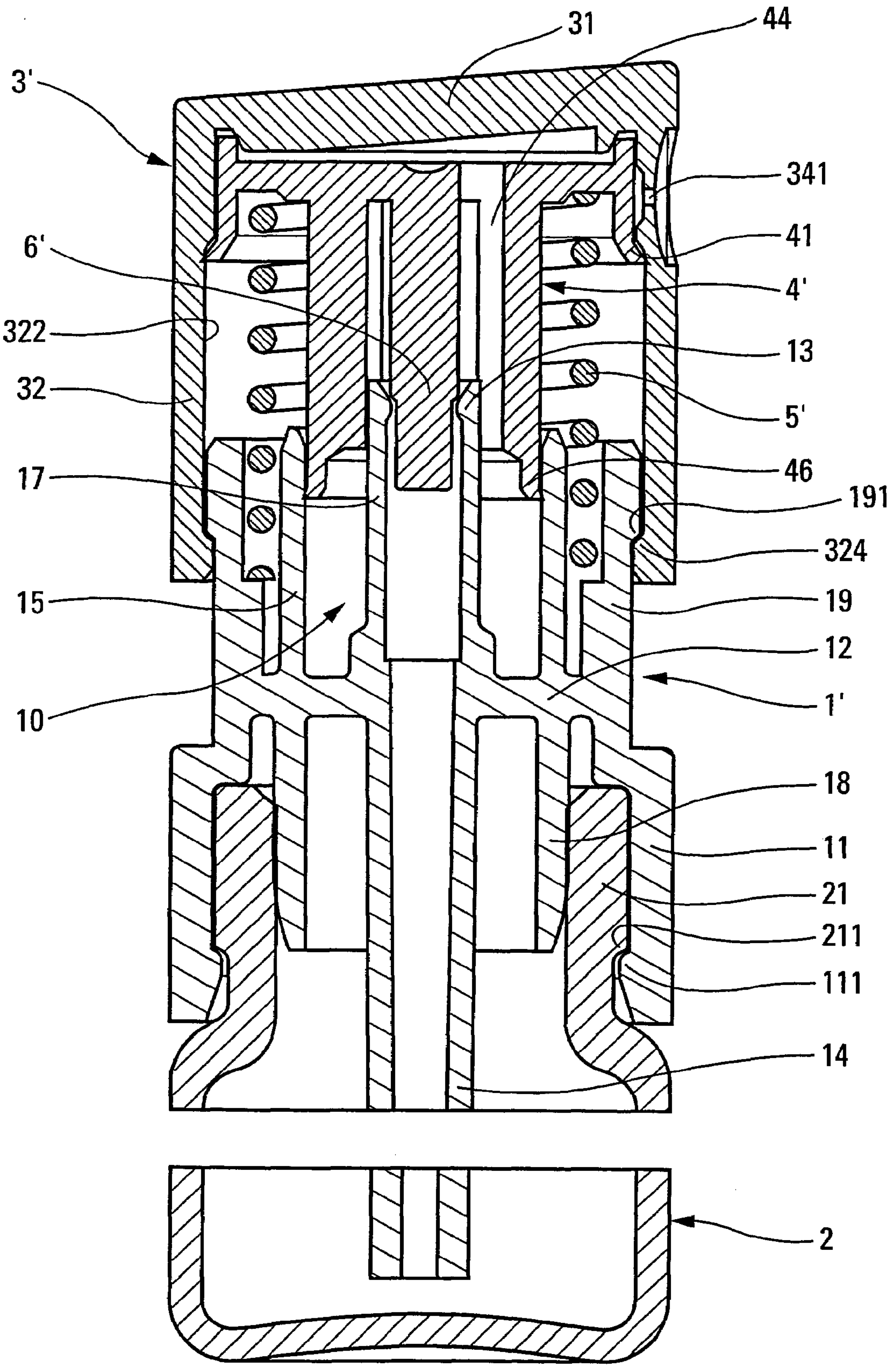
FIG. 2*a* is a vertical section view through a fluid dispenser implementing a dispenser member constituting a second embodiment of the invention in the rest position.
Figure 2B:
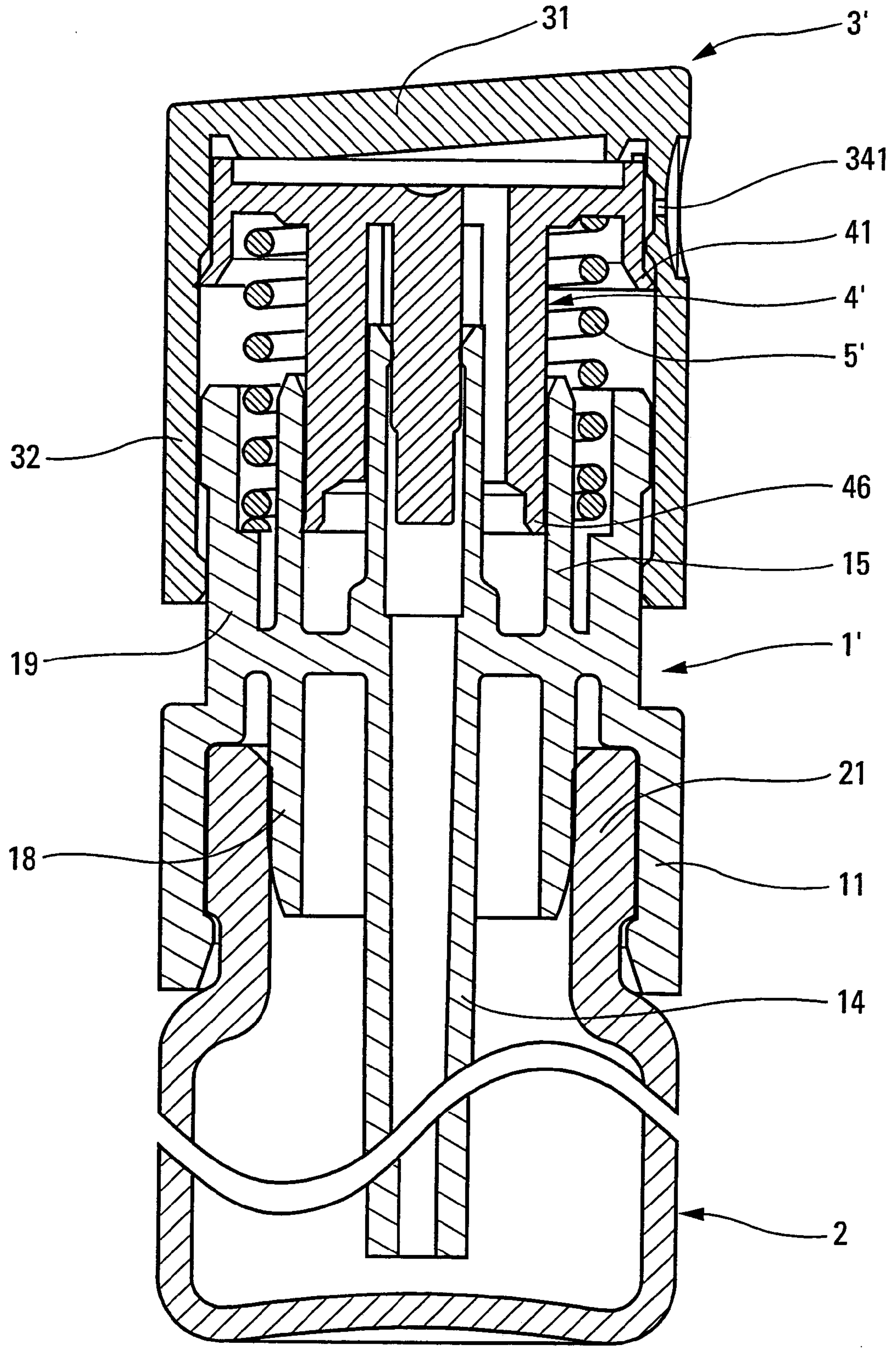
FIG. 2*b* is a view similar to that of FIG. 2*a* in the actuated position.

In the two embodiments in FIGS. 1 and 2*a*, 2*b*, the dispenser member of the invention is designed to be mounted on or associated with a fluid reservoir 2 having an opening in the form of a neck 21. The neck 21 can form an external peripheral thickening so as to define a bottom shoulder which serves in fastening or fixing the dispenser member on the reservoir. In conventional manner, the reservoir includes a reservoir body closed at its bottom by a bottom wall, and defining in its top portion the neck 21. The body of the reservoir can advantageously present a cylindrical shape over at least a portion of its height, and preferably over its entire height. The section of the cylindrical portion can advantageously be circular so that the reservoir presents a generally circularly-cylindrical tubular configuration. Naturally, the particular shape of the reservoir is non-limiting for the present invention, which relates more particularly to the dispenser member.

The neck 21 need not have the bottom shoulder. The dispenser member can also be fastened inside the neck.

In the two embodiments in the figures, the dispenser member is a pump of the precompression type. More particularly, the pump is of the "pusher-pump" type in the meaning defined above. However, the present invention can apply to other types of pump which are not pusher-pumps. However, in the two embodiments shown in the figures, the dispenser member or pump comprises the following component elements, namely: a pump body 1, a pusher 3, a piston element 4, and a spring 5. For the second embodiment in FIGS. 2*a* and 2*b*, the numerical references are given prime symbols.

The body 1, 1' is preferably made of injection-molded plastics material. In the invention, the plastics material used is transparent or at least translucent so that it is possible to see through the body.

The body 1, 1' is provided with fixing means 11, which, in this case, are advantageously made integrally as a single piece with the body. The fixing means 11 comprise an outer peripheral skirt designed to extend around the neck 21. In order to fix the skirt onto the neck, the skirt forms one or more internal fixing profiles 111 designed to be engaged below the shoulder formed by the thick portion of the neck 21. The skirt 11 can be put in place on the neck by force-fitting, and it is fixed permanently by snap-fastening below the shoulder of the neck. Optionally, a vent passage 112 can be provided, as shown in FIG. 1, to enable the outside air to enter the reservoir as the fluid is extracted by the dispenser member.

The skirt can also be engaged in the neck.

The skirt 11 can present a substantially cylindrical outside wall having an outside diameter that is substantially equal to the diameter of the body of the reservoir so that the skirt 11 extends in line with the reservoir, as can be seen in the figures. The skirt 11 thus contributes to softening or to masking the narrowing made by the neck 21.

The body 1, 1' is fixed by means of the skirt 11 onto the neck in sealed manner. Sealing can be provided by means of a neck gasket 113 which is pressed against the top edge of the neck, as in FIG. 1. More precisely, the body forms an annular plate 12 which compresses the gasket 113 when the profiles 111 of the skirt 11 are engaged below the shoulder of the neck 21. The skirt 11 extends downwards from the outer periphery of the plate 12. The second embodiment in FIGS. 2*a* and 2*b* does not have a neck gasket. Sealing is thus guaranteed by a sealing sleeve 18 which comes into sealed contact with the inside wall of the neck 21. The second embodiment is preferred since it eliminates the need to use a gasket, which is generally made of an opaque material and therefore visible. In the second embodiment, the body 1' is fixed directly onto the neck 21 without using any additional piece, so that the user can see directly that the body is fixed onto the neck, since the body is made of a transparent or translucent plastics material.

The body 1, 1' also forms a dip-tube 14 which extends from the plate 12 to the inside of the reservoir 2. The dip-tube 14 and the sealing sleeve 18 are the only elements of the body, and even of the dispenser member, to penetrate into the neck of the reservoir. In addition, the body 1, 1' forms an inlet-valve seat 13. In FIG. 1, the seat 13 is formed substantially at the junction between the dip-tube 14 and the plate 12. A ball 6 rests selectively and in leaktight manner against the seat 13, and serves as a movable inlet-valve member. Alternatively, in the embodiment in FIGS. 2*a* and 2*b*, the seat 13 is provided at the end of the inlet duct 17 which extends substantially in the extension of the dip-tube 14. The dip-tube 14 extends downwards from the plate 12, while the inlet duct 17 extends upwards from the same plate 12. The seat 13 of the inlet valve is formed by a peripheral bead which projects radially inwards. The seat 13 co-operates with a movable inlet-valve member 6' which is described below.

In the first embodiment in FIG. 1, the body 1 also forms a ring 15 which extends upwards from the plate 12. At its top free end, the ring 15 defines a lip 16 for the main piston. In addition, the body 1 defines an inlet duct 17 which is crenellated in part, and which extends from the plate 12 just in the extension of the seat 13.

In the second embodiment in FIGS. 2*a* and 2*b*, the body 1' forms a ring 15 which extends upwards from the plate 12. The inside cylindrical wall of the ring 15 serves as a main cylinder in which a main piston 46 slides (as described below). In addition, the body 1' forms an inner guide bushing 19 which is provided with an abutment profile 191 which extends over the outer periphery of the bushing 19. The inlet duct 17 extends in concentric manner inside the ring 15, which itself extends in concentric manner inside the guide bushing 19.

In the embodiments described above, the body 1 and 1' is advantageously made integrally as a single piece with all of the above-mentioned component elements.

In both embodiments, the pusher 3, 3' comprises a top press wall 31, and a substantially cylindrical peripheral skirt 32. The skirt extends downwards from the outer periphery of the press wall 31. The user can press a finger on the press wall 31. The skirt 32 is provided with a dispenser orifice 341 which can be formed by a nozzle 34 fixed in a suitable housing 321 formed in the skirt. This is the case in FIG. 1. In FIGS. 2*a* and 2*b*, the dispenser orifice 341 is formed directly in the skirt. In the two embodiments, the pusher can be provided with a swirl system enabling the fluid to be swirled before being dispensed through the dispenser orifice 341. In the embodiment in FIG. 1, the swirl system is fed by a small channel 33.

In the two embodiments, the skirt 32 of the pusher forms an inner complementary abutment profile 324 designed to co-operate with the abutment profile 191, which is formed by the guide bushing 19 in the second embodiment, and which is formed by the bottom face of the main piston lip 16 in the embodiment in FIG. 1. When the two abutment profiles are mutually engaged, the pusher is in a rest position, corresponding to FIGS. 1 and 2*a*. In contrast, when the bearing surface 31 is pressed, the complementary abutments move apart, as shown in FIG. 2*b*. The skirt of the pusher then moves closer to the fixing skirt 11.

In the embodiment in FIG. 1, the pusher 3 forms two cylinders 322 and 323 of different diameters on its inside. The top, differential cylinder 322 of smaller diameter is situated at the dispenser orifice 341, and the small channel 33 opens out into said cylinder. The bottom, main cylinder of larger diameter 323 is situated just above the abutment profile 324. The main piston lip 16 is in leaktight sliding contact inside the main cylinder 323.

In the second embodiment, the inside wall of the skirt forms a differential cylinder 322 which has a diameter that is greater than the diameter at the point at which the dispenser orifice 341 is formed.

In both embodiments, the piston element 4, 4' comprises a differential piston 41 which presents a lip in leaktight sliding contact inside the differential cylinder 322. Sliding the differential piston enables an outlet passage to be created for the fluid put under pressure inside the dispenser member. The fluid can thus be expelled through the dispenser orifice. In this case, the pump chamber is created between the body, the pusher, and the piston element.

In order to urge the piston element, and consequently the pusher, towards the rest position in FIGS. 1 and 2*a*, the spring 5, 5' acts on the piston element 4, 4'. In the first embodiment, the spring 5 bears firstly under the press wall 31, and secondly against the piston element 4. Thus, the piston element 4 is urged away from the bearing element 31. In the rest position, the piston element is in abutment against the small inlet duct 17. In this case, the pump chamber 10 is defined between the ring 15, the plate 12, the seat 13, the main cylinder 323, and the piston element 4. When the press wall 31 is pressed, the ball 6 is pressed against the seat 13, and the pusher 3 begins to move relative to the body 1. The lip 16 slides in sealed manner in the main cylinder 323. Simultaneously, the piston element 4 begins to slide in the differential cylinder 322 towards the press wall 31, compressing the spring 5. As soon as the lip of the differential piston 41 arrives at the channel 33, a passage is created for the fluid under pressure in the chamber 10. It can thus escape towards the dispenser orifice 341.

In the second embodiment, the piston element 4' forms a main piston lip 46 in leaktight sliding contact inside the ring 15 which serves as the main cylinder. In addition, the piston element 4' has a passage 44 passing through it, which passage defines a portion of the pump chamber 10. The pump chamber 10 is defined between the ring 15 and the inlet duct 17, by the passage 44, and by a space defined between the top surface of the differential piston 41 and the bottom surface of the press wall 31. In addition, the piston element 4' forms the movable inlet-valve member 6' which co-operates selectively in leaktight manner with the inlet-valve seat 13. The spring 5' urges the piston element 4' towards the press wall 31. To do this, the spring 5' bears firstly against a shoulder of the guide bushing 19, and secondly against the underside of the differential piston 41. This corresponds to the rest position in FIG. 2*a*. Flow between the pump chamber 10 and the dispenser orifice 341 is prevented by leaktight contact formed between the differential piston 41 and the press wall 31. In contrast, as soon as the press wall 31 is pressed, the main piston 41 slides into the cylinder 15, compressing the spring 5'. This causes the piston element 4' to be displaced, moving away from the bearing surface 31, compressing the spring even more. As soon as the piston element 4' is detached from the press wall 31, a passage is created between the pump chamber 10 and the dispenser orifice 341, so that the fluid under pressure can escape.

It should be observed that in both embodiments of the invention, the spring 5, 5' is housed or received entirely inside the pusher 3, 3'. The pusher is preferably made of an opaque or colored plastics material so that the spring inside the pusher is not visible. This is an advantageous characteristic of the invention, given that the user cannot see the spring, even when the body is made of transparent or translucent material.

Another advantageous characteristic of the second embodiment resides in the fact that the piston element 4' is also housed or received entirely inside the pusher 3'. Thus, it is not visible to the user. Consequently, the dispenser member has the appearance of a conventional stopper, and not of a pump. To the user, the dispenser member appears to be made up of two pieces only, in this case the pusher and the transparent or translucent body, so the pusher can be taken as being a conventional stopper portion.

Another advantageous characteristic resides in the fact that the outside wall of the skirt 32 of the pusher advantageously extends in line with the fixing skirt 11, and also with the body of the reservoir 2. Thus, the dispenser constituted by a reservoir and a dispenser member of the invention has a generally circularly-cylindrical tubular appearance.

The type of pump, in this case a "pusher-pump", must not be considered as being the only type of pump capable of implementing the present invention. However, a pusher-pump is advantageous, since it enables some component elements of the pump to be housed inside the same one element, in this case the pusher. As a result, the body can be transparent, thereby further increasing similarity with a simple stopper.

What is claimed is:

1. A fluid dispenser member for a fluid reservoir having a neck, the dispenser member comprising:

a body defining at least part of a fluid chamber, the body comprising coupling structure configured to couple with the neck of the reservoir, the body further comprising a fluid inlet configured to connect an inside of the reservoir to the fluid chamber;

a pusher mounted on the body and axially displaceable between a rest position and a driven-in position; and a spring urging the pusher into the rest position; and wherein the spring is housed entirely inside the pusher in the rest position of the pusher;

wherein the body is made of a transparent or translucent material; and wherein the pusher forms part of the fluid chamber in which fluid is put under pressure by displacing the pusher.

2. A dispenser member according to claim 1 in which the pusher includes a lateral skirt engaged around an inner guide bushing formed on the body.

3. A dispenser member according to claim 2, in which the skirt and the bushing include complementary abutment means defining the rest position.

4. A dispenser member according to claim 1, in which the coupling structure is made integrally as a single piece with the body, and is advantageously designed to be engaged around the neck.

5. A dispenser member according to claim 1, further comprising a piston element that is axially displaceable and slides inside the pusher, the spring urging the piston element and the pusher into the rest position.

6. A dispenser member according to claim 5, in which the piston element forms a movable inlet-valve member that is designed to be pressed in leaktight manner against an inlet valve seal formed on the body.

7. A dispenser member according to claim 5, in which the piston element is housed entirely inside the pusher.

8. The fluid dispenser according to claim 1, wherein the fluid chamber is a pump chamber, the pusher comprises a cylinder, and the pusher comprises a main piston that cooperates with the cylinder to directly pressurize fluid within the pump chamber.

9. A fluid dispenser, comprising a fluid reservoir having a neck a dispenser member comprising:

a body defining at least part of a fluid chamber, the body coupled at a lower portion with the neck of the reservoir, the body further comprising a fluid inlet fluidly connecting an inside of the reservoir to the fluid chamber;

a pusher mounted on an upper portion of the body and axially displaceable between a rest position and a driven-in position and a spring urging the pusher into the rest position; and wherein the spring is housed entirely inside the pusher in the rest position of the pusher;

wherein the body is made of a transparent or translucent material; and wherein the pusher forms part of the fluid chamber in which fluid is put under pressure by displacing the pusher.

10. A dispenser member according to claim 9, in which the body is in leaktight contact with the neck of the reservoir.

11. A dispenser according to claim 9, in which the reservoir, the body, and the pusher have an identical maximum outside diameter, such that the dispenser has an overall cylindrical appearance that is advantageously circular.

12. The fluid dispenser according to claim 9, wherein the fluid chamber is a pump chamber, the pusher comprises a cylinder, end the pusher comprises a main piston that cooperates with the cylinder to directly pressurize fluid within the pump chamber; and wherein the pump chamber is disposed outside the fluid reservoir.

* * * * *